US012690522B2

(12) United States Patent
Schroeder et al.

(10) Patent No.: US 12,690,522 B2
(45) Date of Patent: Jul. 28, 2026

(54) HARVESTING ATTACHMENT FOR WHOLE PLANT HARVESTING

(71) Applicant: DEERE & COMPANY, Moline, IL (US)

(72) Inventors: Maximilian Schroeder, Hettenleidelheim (DE); Martin Huening, Billerbeck (DE); Clemens Weitenberg, Borken (DE); Jan-Dirk Schild, Coesfeld (DE); Ralf Leveling, Gronau Epe (DE)

(73) Assignee: Deere & Company, Moline, IL (US)

( * ) Notice: Subject to any disclaimer, the term of this patent is extended or adjusted under 35 U.S.C. 154(b) by 448 days.

(21) Appl. No.: 18/460,794

(22) Filed: Sep. 5, 2023

(65) Prior Publication Data

US 2024/0130287 A1     Apr. 25, 2024
US 2024/0224867 A9     Jul. 11, 2024

(30) Foreign Application Priority Data

Oct. 20, 2022    (DE) .......................... 102022127703.8

(51) Int. Cl.
    *A01D 57/20*        (2006.01)
    *A01D 34/66*        (2006.01)
                  (Continued)

(52) U.S. Cl.
    CPC ............. *A01D 57/20* (2013.01); *A01D 34/66* (2013.01); *A01D 57/22* (2013.01); *A01D 61/002* (2013.01); *A01D 61/008* (2013.01); *A01D 61/02* (2013.01)

(58) Field of Classification Search
    CPC ........ A01D 57/20; A01D 34/66; A01D 57/22; A01D 61/002; A01D 61/008; A01D 61/02; A01D 43/081; A01D 43/086
    See application file for complete search history.

(56) References Cited

U.S. PATENT DOCUMENTS 1,879,232 A   *   9/1932   Henry ................... B65G 39/10
                                          198/829
1,972,407 A   *   9/1934   Morse .................. A01D 61/008
                                          56/364
                   (Continued)

FOREIGN PATENT DOCUMENTS

DE      102005005614 A1 *   8/2006   ......... A01D 43/083
DE      102005009939 A1 *   9/2006   ......... A01D 43/083
                   (Continued)

OTHER PUBLICATIONS

Extended European Search Report and Written Opinion issued in European Patent Application No. 23201903.4, dated Mar. 1, 2024, in 14 pages.

*Primary Examiner* — Arpad Fabian-Kovacs

(57) ABSTRACT

A harvesting attachment for whole plant harvesting includes a pick-up for picking up plants from a field, a first transverse conveyor belt and a second transverse conveyor belt for conveying the plants picked up transversely in a direction toward of a longitudinal center plane of the harvesting attachment, and two longitudinal conveyor belts which are arranged side-by-side and adjacent to the longitudinal center plane of the harvesting attachment and are set up to convey the plants entering from the transverse conveyor belts rearward to a rear discharge point of the harvesting attachment. The two longitudinal conveyor belts are inclined vertically upward in a direction toward the center plane at least over part of their length along the center plane.

10 Claims, 3 Drawing Sheets

(51) Int. Cl.
    *A01D 57/22*       (2006.01)
    *A01D 61/00*       (2006.01)
    *A01D 61/02*       (2006.01)

(56)         References Cited

U.S. PATENT DOCUMENTS

| | | | | |
|---|---|---|---|---|
| 2,169,625 | A * | 8/1939 | Weiss | B65G 39/02 |
| | | | | 277/423 |
| 2,608,041 | A * | 8/1952 | Schoenrock | A01D 61/008 |
| | | | | 56/185 |
| 4,956,966 | A * | 9/1990 | Patterson | A01D 41/14 |
| | | | | 56/181 |
| 5,464,371 | A * | 11/1995 | Honey | A01D 41/14 |
| | | | | 56/189 |
| 7,802,417 | B2 * | 9/2010 | Sauerwein | A01D 41/14 |
| | | | | 56/181 |
| 7,823,372 | B1 * | 11/2010 | Kraus | A01D 57/20 |
| | | | | 56/192 |
| 7,827,773 | B2 * | 11/2010 | Sauerwein | A01D 57/20 |
| | | | | 56/181 |
| 9,144,197 | B2 * | 9/2015 | Gahres | A01D 41/14 |
| 9,320,198 | B2 * | 4/2016 | Trowbridge | A01D 75/182 |
| 10,292,331 | B2 * | 5/2019 | Lauwers | A01D 61/002 |
| 10,412,891 | B2 * | 9/2019 | Joyce | A01D 61/002 |
| 10,575,467 | B2 * | 3/2020 | Fuechtling | A01D 34/14 |
| 11,304,370 | B2 * | 4/2022 | Trowbridge | A01D 61/002 |
| 11,523,561 | B2 * | 12/2022 | Bueermann | A01D 41/141 |
| 11,805,735 | B2 * | 11/2023 | Hefner | A01D 45/065 |
| 12,453,312 | B2 * | 10/2025 | Franke | A01D 57/20 |
| 2006/0254241 | A1 * | 11/2006 | Kempf | A01D 57/20 |
| | | | | 56/16.6 |
| 2007/0033913 | A1 * | 2/2007 | Kincaid | A01D 41/12 |
| | | | | 56/16.5 |
| 2008/0161077 | A1 * | 7/2008 | Honey | A01D 41/16 |
| | | | | 460/106 |
| 2008/0202090 | A1 * | 8/2008 | Lovett | A01D 57/20 |
| | | | | 198/837 |
| 2009/0277144 | A1 * | 11/2009 | Honas | A01D 57/20 |
| | | | | 56/153 |
| 2013/0097986 | A1 * | 4/2013 | Lovett | A01D 41/14 |
| | | | | 56/153 |
| 2015/0156969 | A1 * | 6/2015 | Mossman | A01D 57/20 |
| | | | | 56/153 |
| 2016/0242358 | A1 * | 8/2016 | Mossman | A01D 61/008 |
| 2016/0330904 | A1 | 11/2016 | Weitenberg et al. | |
| 2016/0345497 | A1 * | 12/2016 | Hasenour | A01D 57/20 |
| 2016/0360699 | A1 * | 12/2016 | Allochis | A01D 41/14 |
| 2018/0084724 | A1 * | 3/2018 | Fuchtling | A01D 57/20 |
| 2019/0104682 | A1 * | 4/2019 | Mossman | A01D 57/20 |
| 2020/0229347 | A1 | 7/2020 | Lyons et al. | |
| 2024/0065164 | A1 * | 2/2024 | Hefner | A01D 57/02 |
| 2024/0306546 | A1 * | 9/2024 | Noll | A01D 41/14 |

FOREIGN PATENT DOCUMENTS

| | | | | | |
|---|---|---|---|---|---|
| DE | 102006020792 | A1 * | 11/2007 | | A01D 43/082 |
| DE | 102015206845 | A1 | 10/2016 | | |
| DE | 102021125044 | A1 * | 3/2023 | | A01D 43/081 |
| EP | 0760200 | A1 | 3/1997 | | |
| EP | 0824856 | A2 | 2/1998 | | |
| EP | 1256272 | A1 | 11/2002 | | |
| EP | 3286999 | A1 * | 2/2018 | | A01D 57/20 |
| EP | 3298879 | A1 | 3/2018 | | |
| EP | 3473075 | A1 | 4/2019 | | |
| EP | 3574741 | A1 | 12/2019 | | |
| EP | 3298879 | B1 | 11/2020 | | |

* cited by examiner

HARVESTING ATTACHMENT FOR WHOLE PLANT HARVESTING

CROSS-REFERENCE TO RELATED APPLICATIONS

This application claims the benefit of German Patent Application DE 102022127703.8, filed on Oct. 20, 2022, the disclosure of which is hereby incorporated by reference.

TECHNICAL FIELD

The disclosure generally relates to a harvesting attachment for a harvesting machine.

BACKGROUND

Among the devices used in the prior art for harvesting complete stalk-type plants, such as cereals or grass, are harvesting attachments with transverse conveyor belts (sometimes referred to as "draper belts"). For harvesting cereals, use is made of headers which hold the plants by means of a reel or convey them backward and cut them off with mowing knives. The cut, above-ground parts of the plants, come to lie on transverse conveyor belts and are transported by these to the center of the harvesting attachment. There they are taken over by a further longitudinal conveyor belt, which conveys them away to the rear and discharges them through a rear opening into a self-propelled harvesting machine, such as a combine harvester.

Harvesting attachments with transverse conveyor belts are also used in conjunction with forage harvesters for harvesting green material (grass or other stalk-type plants) by means of a pick-up. The pick-up may include a device or system operable to gather previously cut crop material from the ground surface, or to cut standing crop material. The pick-up may include, but is not limited to, a drum or rotor, a drum or disk mower (EP 1 256 272 A1), or a cutter bar mower having cutting disks and conveying rotors arranged coaxially thereabove (DE 10 2015 206 845 A1 for harvesting plants smaller than corn).

In the case of the transverse conveyor belts, the transverse transport of the plants is based solely on the effect of gravity, i.e., the weight of the cut crop material acting on the transverse conveyor belts. One potential problem here is the transfer of the plants from one of the laterally conveying transverse conveyor belts to the rearward-conveying longitudinal conveyor belt. This transfer is relatively problem-free if plants enter from both sides at equal volumes and at equal rates, but can become problematic if they arrive only from a single side, for example if residual crops to be harvested are narrower than the working width or gaps in the crop extend over only part of the working width. In such cases, the plants entering from one side can overshoot the rearward-conveying longitudinal conveyor belt and be engaged by the other opposite transverse conveyor belt. Crop material overshooting the longitudinal conveyor belt may be drawn in downward and form a blockage underneath, which has to be cleared by the operator. In the case of headers for cereals, it has been proposed to automatically reduce the transverse conveying speed in such cases in order to avoid the problem (EP 3 574 741 A1).

Another approach for improving the transfer of the plants from the lateral transverse conveyor belts to the rearward-conveying longitudinal conveyor belt consists in dividing the longitudinal conveyor belt into two adjacent belts which diverge forward to form a V shape. The rearward-conveying longitudinal conveyor belts are therefore not oriented exactly in the forward direction but consist of two halves which are angled forward and outward and are arranged side-by-side (EP 3 298 879 A1) on a common horizontal plane. As a result, the problem of overshooting in the case of uneven lateral distribution of the harvested crop cannot really be solved, and this applies analogously to the conveyor belt constructed from two parts moving with the flexible mowing knife according to EP 3 473 075 A1 and the downwardly twisted inner sections of the transverse conveyors according to US 2020/0229347 A1.

SUMMARY

A harvesting attachment for whole plant harvesting is provided. The harvesting attachment may be attached to a harvesting machine and can be moved over a field in a forward direction. The harvesting attachment includes a supporting frame, a pick-up extending substantially over the width of the harvesting attachment for picking up plants from the field, a first transverse conveyor belt and a second transverse conveyor belt for conveying the plants picked up by the pick-up from the field transversely in the direction of a longitudinal central plane of the harvesting attachment, a first longitudinal conveyor belt and a second longitudinal conveyor belt which are arranged side-by-side and adjacent to the longitudinal central plane of the harvesting attachment and are set up to convey the plants entering from the transverse conveyor belts rearward to a rear discharge point of the harvesting attachment. The conveyor belts are inclined to the side at least over part of their length.

As a result, the plants conveyed in the transverse direction by the transverse conveyor belts strike the laterally inclined surfaces of the longitudinal conveyor belts, facilitating the deflection of the plants and avoiding or at least reducing the probability of the crop material overshooting the longitudinal conveyor belts and/or forming a blockage in the system.

In one aspect of the disclosure, the longitudinal conveyor belts can each revolve around a front deflection roller and a rear deflection roller. The axis of rotation of the front deflection roller may be inclined downward and outward. The axis of rotation of the rear deflection roller may have the same lateral inclination as the front deflection roller, may have a smaller inclination than the front deflection roller, or can be arranged horizontally.

In one aspect of the disclosure, a separating element may be arranged between the longitudinal conveyor belts. The separating element facilitates the rearward deflection of the plants and can also help to prevent the plants from entering or at least make it more difficult for the plants to enter the interior of the longitudinal conveyor belts. The separating element can extend over a partial region, in particular a front partial region, of the length of the longitudinal conveyor belts or over the entire length thereof. In the vertical plane, the separating element may extend transversely to the surface of the respectively adjacent conveyor belt, i.e., generally perpendicular to the longitudinal conveyor belts.

In one aspect of the disclosure, the pick-up may be embodied, in particular, as mowing and intake devices for harvesting stalk-type plants, such as corn. In the case of such large plants, the stated deflection problems are even more likely than in the case of the harvesting of cereals, and therefore the present disclosure proves to be particularly useful in the harvesting of such plants. The mowing and intake devices can each have, in a manner known per se, a lower cutting disk and one or more conveying disks arranged thereabove with recesses distributed around their circumference for receiving plants that are cut off from their roots by means of the cutting disks. Associated strippers may discharge the harvested crop from the conveying disks as far out (i.e. early) onto the transverse conveyor belts as possible, which can reduce transfer problems.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
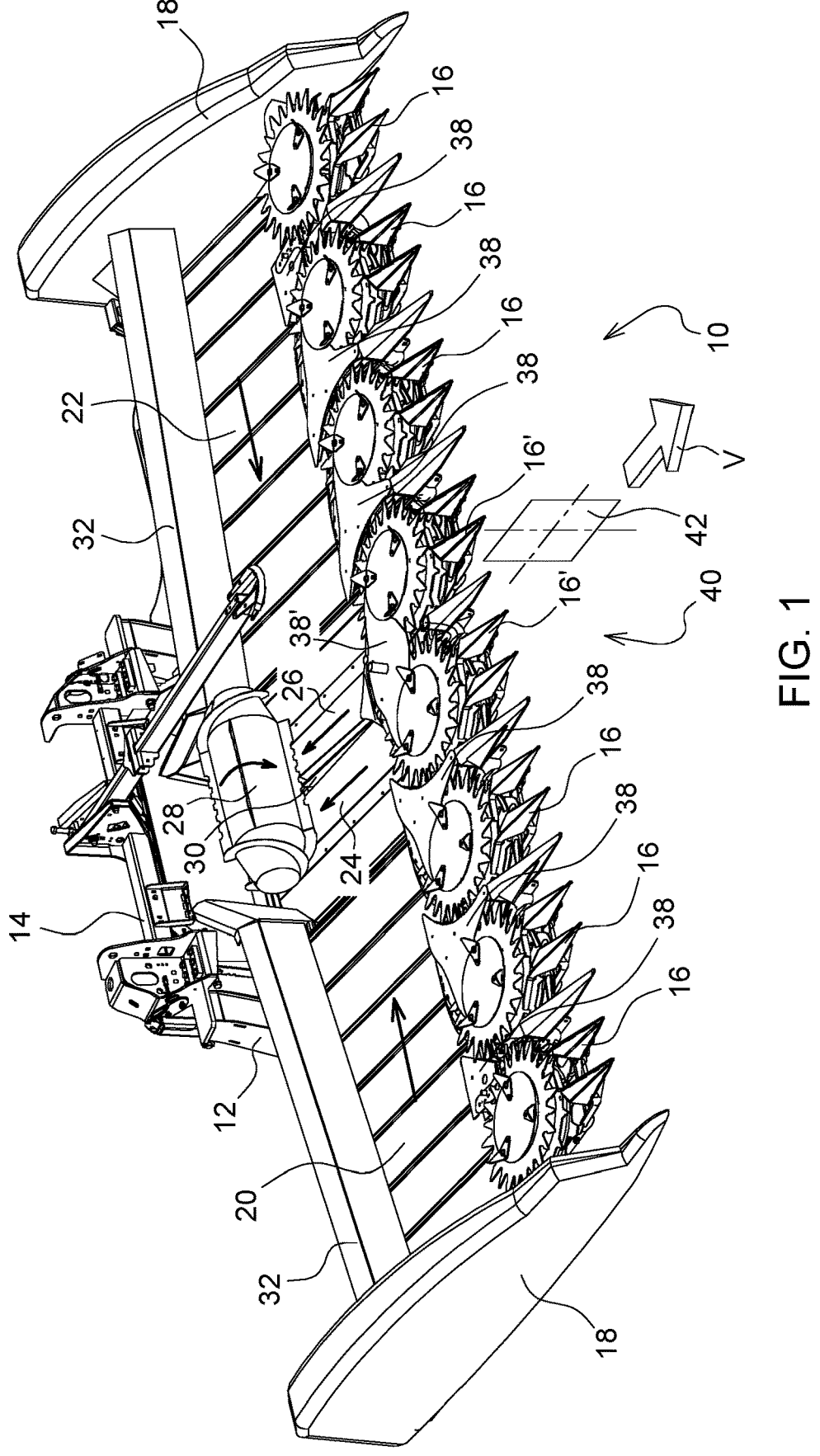
FIG. 1 is a perspective view of a first implementation of a harvesting attachment.

Referring to the Figures, wherein like numerals indicate like parts throughout the several views, FIG. 1 shows a perspective view of a harvesting attachment 10 suitable for whole plant harvesting. The harvesting attachment 10 is built up on a supporting frame 12, which is provided in the middle with a rear mounting frame 14. The mounting frame 14 is configured for attachment to a feed conveyor of a self-propelled harvesting machine (not shown). As a discharge point for the harvested plants, the mounting frame 14 has a central discharge opening, through which harvested crops picked up from a field can be discharged into the feed conveyor. The harvesting machine can be, in particular, a forage harvester whose feed conveyor is equipped with pre-compression rollers which compress the harvested crop and feed it to a cutterhead which, in cooperation with a counter-blade, divides it into small pieces. Downstream of the cutterhead, the harvested crop can be further processed by conditioner rolls and conveyed by a post-accelerator into an ejector elbow.

On its front side, the supporting frame 12 holds a number (eight in the exemplary implementation illustrated) of mowing and intake devices 16 serving as a pick-up 40 for gathering, cutting, and/or picking up plants from a field, as are used on conventional harvesting attachments for harvesting stalk-type plants. The mowing and intake devices 16 comprise, in a manner known per se (cf. EP 0 760 200 A1), lower cutting disks (rotating or stationary) and conveying disks arranged thereabove. The conveying disks include recesses distributed around their circumference for receiving plants that are cut off by means of the cutting disks from their roots, which remain in the ground. Smaller stalk dividers are arranged in front of the mowing and intake devices 16. Side walls 18 with stalk dividers in front are arranged on the outer lateral ends of the harvesting attachment 10. During harvesting, the mowing and intake devices 16 first convey the plants on their front sides laterally outward, then rearward and finally inward with their rear sides (the direction indications relate to the forward direction V of the harvesting attachment 10, which runs obliquely downward and to the right in FIG. 1). There, they are lifted outward or rearward (with respect to the direction of rotation of the mowing and intake devices 16) out of the recesses by strippers 38 and are taken over from the rear side of an inwardly following mowing and intake device 16, and/or reach one of a first transverse conveyor belt 20, a second transverse conveyor belt, 22, a first central longitudinal conveyor belt 24, or a second central longitudinal conveyor belt 26, in particular being pushed rearward by plants coming in from the front, said belts conveying them to the rear and through the discharge opening. Rear walls 32 are provided to the rear of the transverse conveyor belts 20, 22. Particularly in the case of the two central mowing and intake devices 16' directly adjacent to a longitudinal center plane 42 of the harvesting attachment 10, it is possible, by suitable attachment of a central stripper 38', to ensure that these central mowing and intake devices 16' discharge their harvested crop as early as possible (offset outward with respect to the axis of rotation of the central mowing and intake device 16') in order to avoid problems with transfer to the longitudinal conveyor belts 24, 26, which are central (in the case of the inclined conveyor belts, cf. below) (and thus located vertically somewhat higher in their center than the transverse conveyor belts 20, 22). Similarly, the other mowing and intake devices 16 can also deliver their harvested crop to the transverse conveyor belts 20, 22 as early as possible (offset outward with respect to the axis of rotation of the mowing and intake devices 16).

Above the central longitudinal conveyor belts 24, 26, upstream of the rear discharge opening, a roll 28 designed as a cylinder with conical ends is provided, which facilitates the introduction of the plants into the discharge opening. The conical ends of the roll 28 are provided with helical drivers, while the central, cylindrical part of the roll 28 is provided with axially extending drivers. The roll 28 can be driven in the direction of the arrow shown or can rotate freely.

Since the complete cut plants are conveyed into the harvesting machine, the harvesting attachment 10 thus serves for whole plant harvesting of larger stalk-type plants, such as corn. The mowing and intake devices 16 can also be used (optionally with slight modifications, cf. EP 0 824 856 A2) for introducing what is referred to as whole plant silage, i.e. cereal plants. It would also be possible to replace the mowing and intake devices 16 as pick-up 40 means by mowing elements according to DE 10 2015 206 845 A1 with lower cutting and upper conveying disks in order to harvest plants smaller than corn. For harvesting cereals (where the harvesting attachment 10 shown is provided with a reel, i.e. is embodied as a "draper-belt header", and can also be attached to an inclined conveyor of a combine harvester), a conventional cutterbar could also be used, and for grass harvesting a number of mowing disks or drums arranged side-by-side or a collecting drum extending over the width (see EP 1 256 272 A1) could be used.

The upper sides of the transverse conveyor belts 20, 22 (arranged horizontally or slightly forwardly and downwardly inclined with respect to the forward direction V) move inward toward the center plane 42 during harvesting, while the upper side of the longitudinal conveyor belts 24, 26 (arranged horizontally or slightly forwardly and downwardly inclined with respect to the forward direction V) then move rearward, as indicated by the arrows in FIG. 1. The mowing and intake devices 16 as well as the transverse conveyor belts 20, 22 and the longitudinal conveyor belts 24, 26 can be driven via a mechanical drive train from the harvesting machine carrying the harvesting attachment 10 or by associated electric or hydraulic motors (not shown), which make it possible to adjust the conveying speed and to adapt it to the conveying speed in the intake channel of the harvesting machine moving the harvesting attachment 10 over the field and thus to the cutting length.

One potential problem of the harvesting attachment 10 lies in the transfer of the plants from the transverse conveyor belts 20, 22 to the rearward-conveying longitudinal conveyor belts 24, 26. During this transfer, the plants are deflected rearward by 90°. Particularly if, as mentioned at the outset, plants do not run in from both transverse conveyor belts 20, 22 (or there are relatively large differences in the respective incoming material flows), plants may be thrown from one transverse conveyor belt 20 or 22 beyond the longitudinal conveyor belts 24, 26, with the result that the plants reach the respective other transverse conveyor belt 22 or 20 and, under unfavorable circumstances, are drawn in downward by the latter, resulting in a jam which has to be removed manually by the operator. However, even if there is no jam, there is at least a risk of an uneven flow of material.

Figure 2:
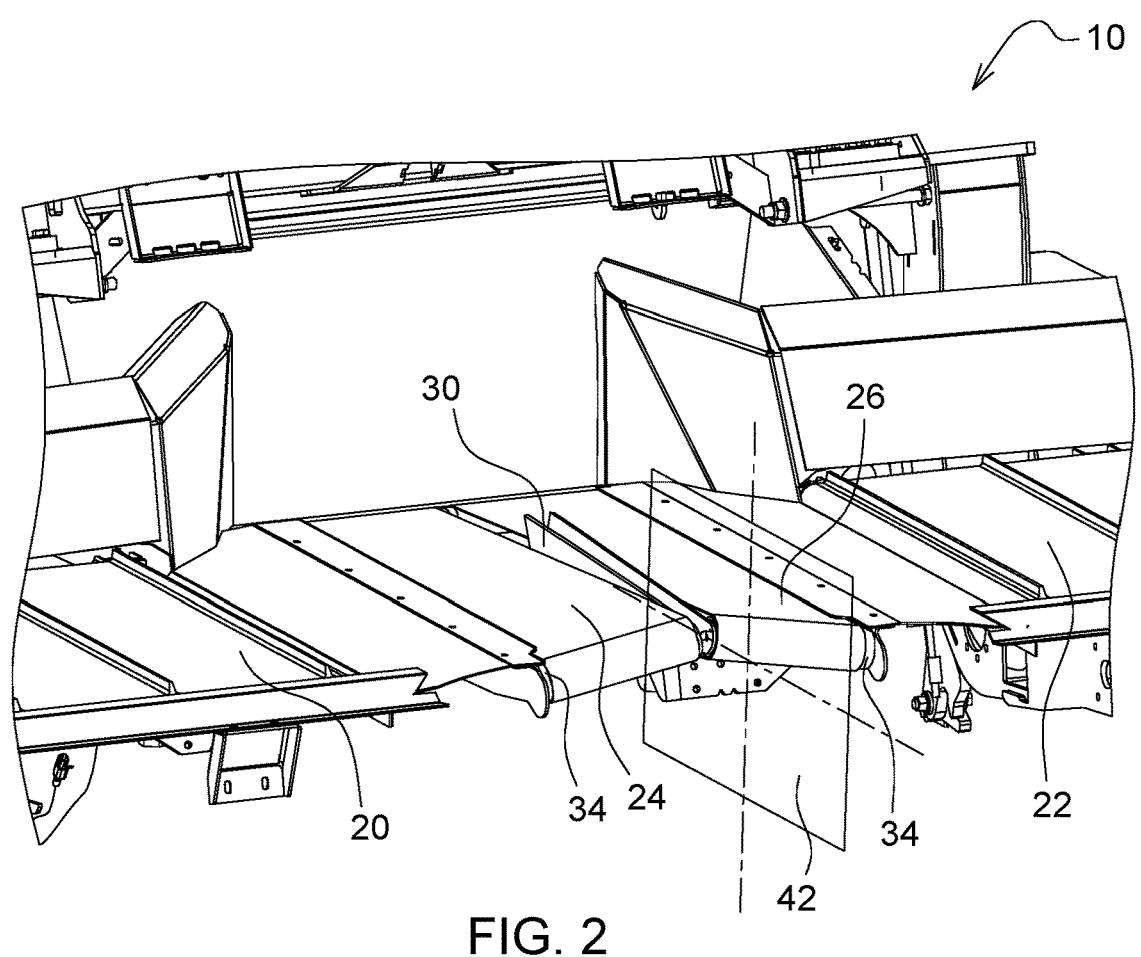
FIG. 2 is a perspective view of the central region of the harvesting attachment of FIG. 1 viewed from the front.
Figure 3:
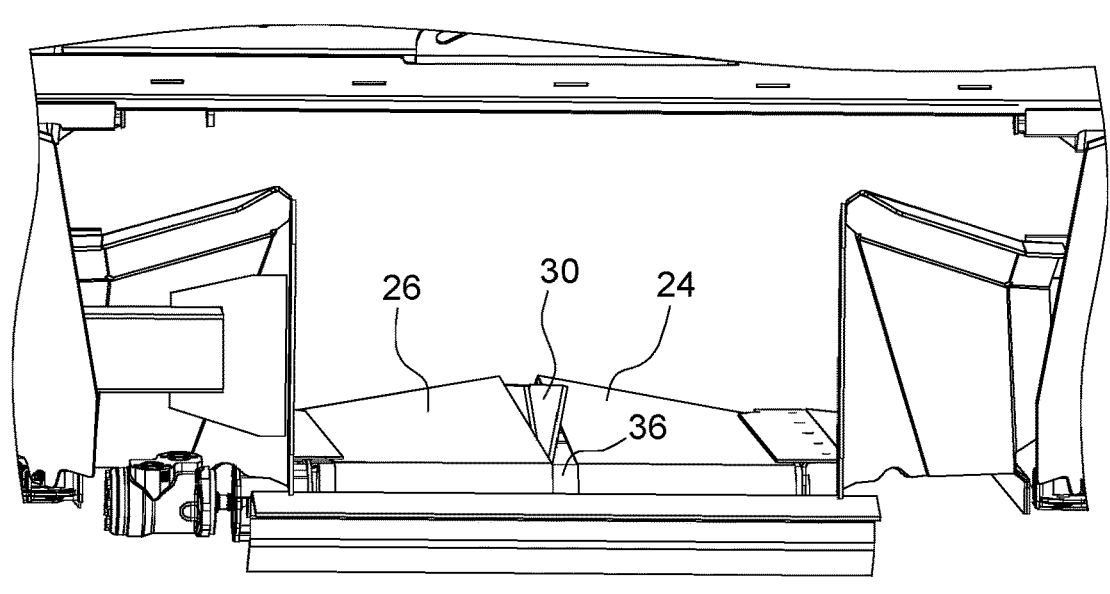
FIG. 3 is a perspective view of the central region of the harvesting attachment of FIG. 1 viewed from behind.
Figure 4:
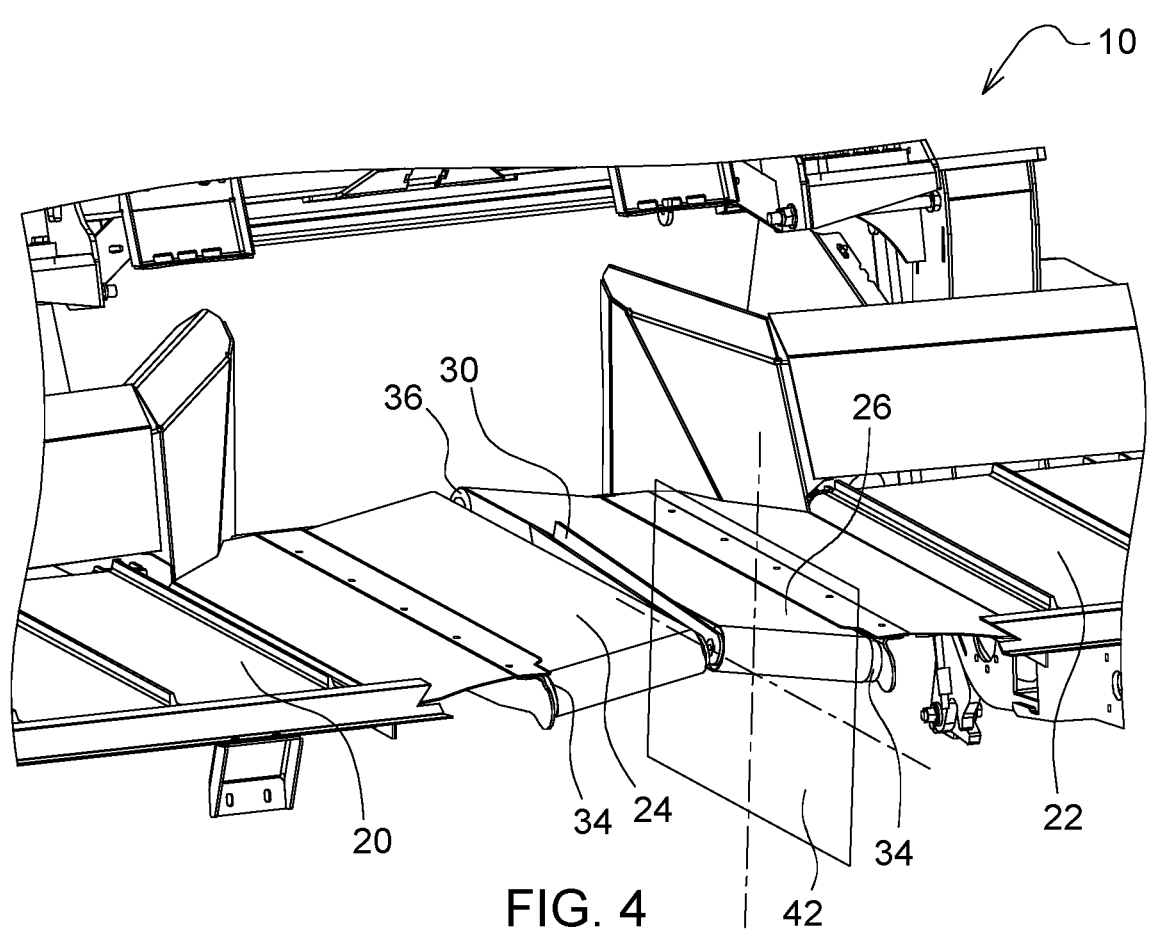
FIG. 4 is a perspective view of the central region of a second implementation of the harvesting attachment viewed from the front.
Figure 5:
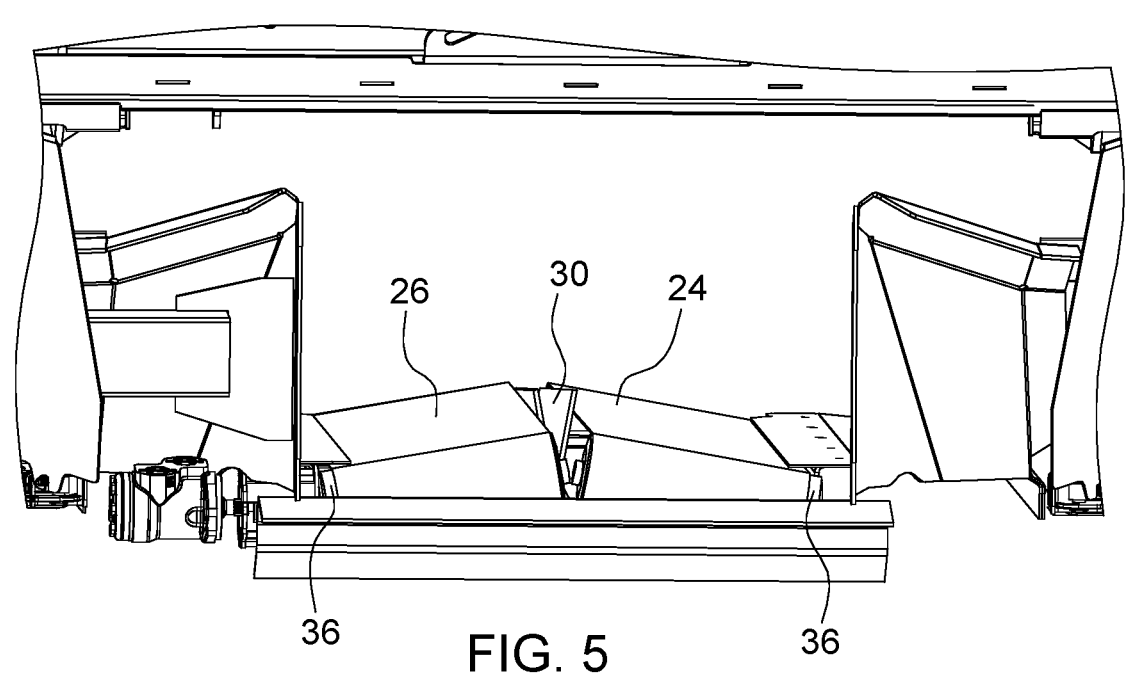
FIG. 5 is a perspective view of the central region of the second implementation of the harvesting attachment shown in FIG. 4 viewed from the rear.

In order to solve or at least reduce this problem, the rearward-conveying longitudinal conveyor belts 24, 26 are not, as hitherto customary, in one piece and arranged so as to extend in a single plane but are per se inclined outward, at least over a part of their length measured in the forward direction. In other words, the two rearward-conveying longitudinal conveyor belts 24, 26 are arranged at an acute angle to one another and to the horizontal, thus forming a roof shape (inverted V). To achieve this, it is possible for (only) the front deflection rollers 34 of the longitudinal conveyor belts 24, 26 to have axes of rotation inclined obliquely outward and downward relative to the center plane 42, as in the first embodiment shown in FIG. 1 to 3, or for the rear deflection rollers 36 of the conveyor belts 24, 26 also to be provided with axes of rotation inclined outward and downward relative to the center plane 42, as in the second embodiment shown in FIGS. 4 and 5. In the first embodiment, the longitudinal conveyor belts 24, 26 are thus twisted upon themselves, whereas in the second embodiment they are not twisted. Intermediate forms are also possible in which the axes of rotation of both the rear deflection rollers 36 and of the front deflection rollers 34 are inclined outward and downward relative to the center plane 42, but with smaller angles of inclination of the rear deflection rollers 36 than the front deflection rollers 34.

In all embodiments, the longitudinal conveyor belts 24, 26 can be enabled to run off from the deflection rollers 34, 36 by cooperating features of the deflection rollers 34, 36 and of the conveyor belts 24, 26, for example depressions in the deflection rollers 34, 36, into which projecting elements on the inside of the conveyor belts 24, 26 enter.

The longitudinal conveyor belts 24, 26 inclined to the side are used to ensure that the flow of plants running in from the transverse conveyor belts 20, 22 interacts with the longitudinal conveyor belts 24, 26 inclined inward and upward as the crop material moves toward the center plane 42. This ensures that the respective plants at the bottom of the material flow not only rest on the longitudinal conveyor belts 24, 26 but are pressed against the longitudinal conveyor belts 24, 26 with a certain contact pressure. The resulting normal force (i.e. force directed transversely to the conveying direction of the longitudinal conveyor belts 24, 26) facilitates the deflection of the plants to the rear.

Overshooting of the plants onto the respective other side can be avoided or reduced by means of a separating element 30, which extends in the vertical direction between the two longitudinal conveyor belts 24, 26. As shown in the figures, the separating element 30 can be designed as an inverted V. As a result, the lateral surfaces of the separating element 30 each extend in the vertical plane transversely to the axis of rotation of the front deflection roller 34, helping to avoid a situation where harvested crop gets into the interior of the longitudinal conveyor belts 24, 26. The separating element 30 can extend over a (in particular the front) partial region of the length of the longitudinal conveyor belts 24, 26, as shown in the figures, for example over the front half (or can end directly in front of the roll 28), or over the entire length thereof.

In the figures, the longitudinal axes of the conveyor belts 24, 26 extend parallel to the forward direction V. They could also be arranged in a V shape, as in EP 3 298 879 A1.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A harvesting attachment for attachment to a harvester machine, the harvester attachment comprising:
  a supporting frame defining a longitudinal center plane;
  a pick-up supported by the supporting frame and operable to gather cut crop;
  a first transverse conveyor belt and a second transverse conveyor belt disposed on opposite sides of the longitudinal center plane, with each of the first transverse conveyor belt and the second transverse conveyor belt operable to convey the cut crop laterally inward toward the longitudinal center plane;
  a first longitudinal conveyor belt and a second longitudinal conveyor belt disposed on opposite sides of the longitudinal center plane, between the first transverse conveyor belt and the second transverse conveyor belt, with each of the first longitudinal conveyor belt and the second longitudinal conveyor belt operable to convey the cut crop longitudinally along the longitudinal center plane rearward relative to a direction of travel during operation; and
  wherein the first longitudinal conveyor belt and the second longitudinal conveyor belt are each inclined laterally in a respective direction that is transverse to the longitudinal center plane and that is inward and upward relative to the longitudinal center plane over at least a portion of their respective length along the longitudinal center plane.

2. The harvesting attachment set forth in claim 1, wherein the first and second longitudinal conveyor belts each revolve around a respective front deflection roller and a rear deflection roller, and wherein an axis of rotation of the respective front deflection roller of the first and second longitudinal conveyor belts is inclined in a direction downward and outward from the longitudinal center plane.

3. The harvesting attachment set forth in claim 2, wherein the axis of rotation of the respective rear deflection roller of the first and second longitudinal conveyor belts has the same lateral inclination as the front deflection roller of the first and second longitudinal conveyor belts.

4. The harvesting attachment set forth in claim 2, wherein the axis of rotation of the respective rear deflection roller of the first and second longitudinal conveyor belts has a lesser lateral inclination as the front deflection roller of the first and second longitudinal conveyor belts.

5. The harvesting attachment set forth in claim 2, wherein the axis of rotation of the respective rear deflection roller of the first and second longitudinal conveyor belts is arranged substantially horizontally.

6. The harvesting attachment set forth in claim 1, further comprising a separating element arranged between the first and second longitudinal conveyor belts.

7. The harvesting attachment set forth in claim 6, wherein the separating element extends at least partially over a length of the first and second longitudinal conveyor belts along the longitudinal center plane.

8. The harvesting attachment set forth in claim 6, wherein the separating element extends vertically.

9. The harvesting attachment set forth in claim 1, wherein the pick-up includes mowing and intake devices for harvesting stalk-type plants.

10. The harvesting attachment set forth in claim 9, wherein the mowing and intake devices each have a lower cutting disk and conveying disks arranged thereabove, the conveying disks including recesses distributed around their circumference for receiving plants that are cut off by means of the cutting disks.

* * * * *